(12) United States Patent
Madden et al.

(10) Patent No.: US 6,886,495 B1
(45) Date of Patent: May 3, 2005

(54) MODULAR HOUSING FOR CATS

(75) Inventors: Walter G. Madden, Chesterfield, MI (US); J. Stacy Cox, Fayetteville, AR (US)

(73) Assignee: Madcox, Inc., Chesterfield, MI (US)

( * ) Notice: Subject to any disclaimer, the term of this patent is extended or adjusted under 35 U.S.C. 154(b) by 0 days.

(21) Appl. No.: 10/811,004

(22) Filed: Mar. 26, 2004

(51) Int. Cl.$^7$ .............................................. A01K 1/03
(52) U.S. Cl. ..................................... 119/482; 119/706
(58) Field of Search ..................... 119/482, 485, 706, 119/702, 705; 446/105, 106, 111, 122, 123

(56) References Cited

U.S. PATENT DOCUMENTS

| | | | | |
|---|---|---|---|---|
| 311,793 | A * | 2/1885 | Stranders | 446/105 |
| 1,358,119 | A * | 11/1920 | Shrock | 119/431 |
| 2,921,347 | A * | 1/1960 | Solomon | 52/262 |
| 3,774,576 | A * | 11/1973 | Moore | 119/480 |
| 3,804,066 | A * | 4/1974 | Lowe | 119/431 |
| 4,270,302 | A * | 6/1981 | Dandia | 446/105 |
| 4,301,766 | A | 11/1981 | Piccone | |
| 4,347,807 | A | 9/1982 | Reich | |
| 4,497,279 | A * | 2/1985 | Bell | 119/706 |
| 4,571,200 | A * | 2/1986 | Serna | 446/85 |
| 4,793,286 | A | 12/1988 | Buxton | |
| 5,320,065 | A | 6/1994 | Leopold | |
| 5,452,681 | A | 9/1995 | Ho | |
| 5,577,465 | A | 11/1996 | Cook | |
| 5,577,466 | A * | 11/1996 | Luxford | 119/706 |
| 5,779,517 | A * | 7/1998 | Clarke | 446/108 |
| 6,431,119 | B1 | 8/2002 | Beymer | |
| 2003/0221628 | A1 * | 12/2003 | Leon | 119/28.5 |

OTHER PUBLICATIONS

Declaration of James Stacey Cox.

* cited by examiner

*Primary Examiner*—Yvonne R. Abbott
(74) *Attorney, Agent, or Firm*—Cook, Alex, McFarron, Manzo, Cummings & Mehler, Ltd.

(57) ABSTRACT

A modular, multi-level pet housing that comprises a plurality of multi-sided boxes. A top and bottom is provided for each box. A plurality of tubular columns of a first length generally less than the height of the side walls and a plurality of tubular columns of a second length generally longer than the height of the side walls are provided. The tubular columns may be joined to each other by a coupling member. The top and bottom of each box is formed with a hole adjacent each corner that is sized to selectively permit one of the tubular members to fit therethrough, but to prevent an associated sleeve member from fitting therethrough.

14 Claims, 2 Drawing Sheets

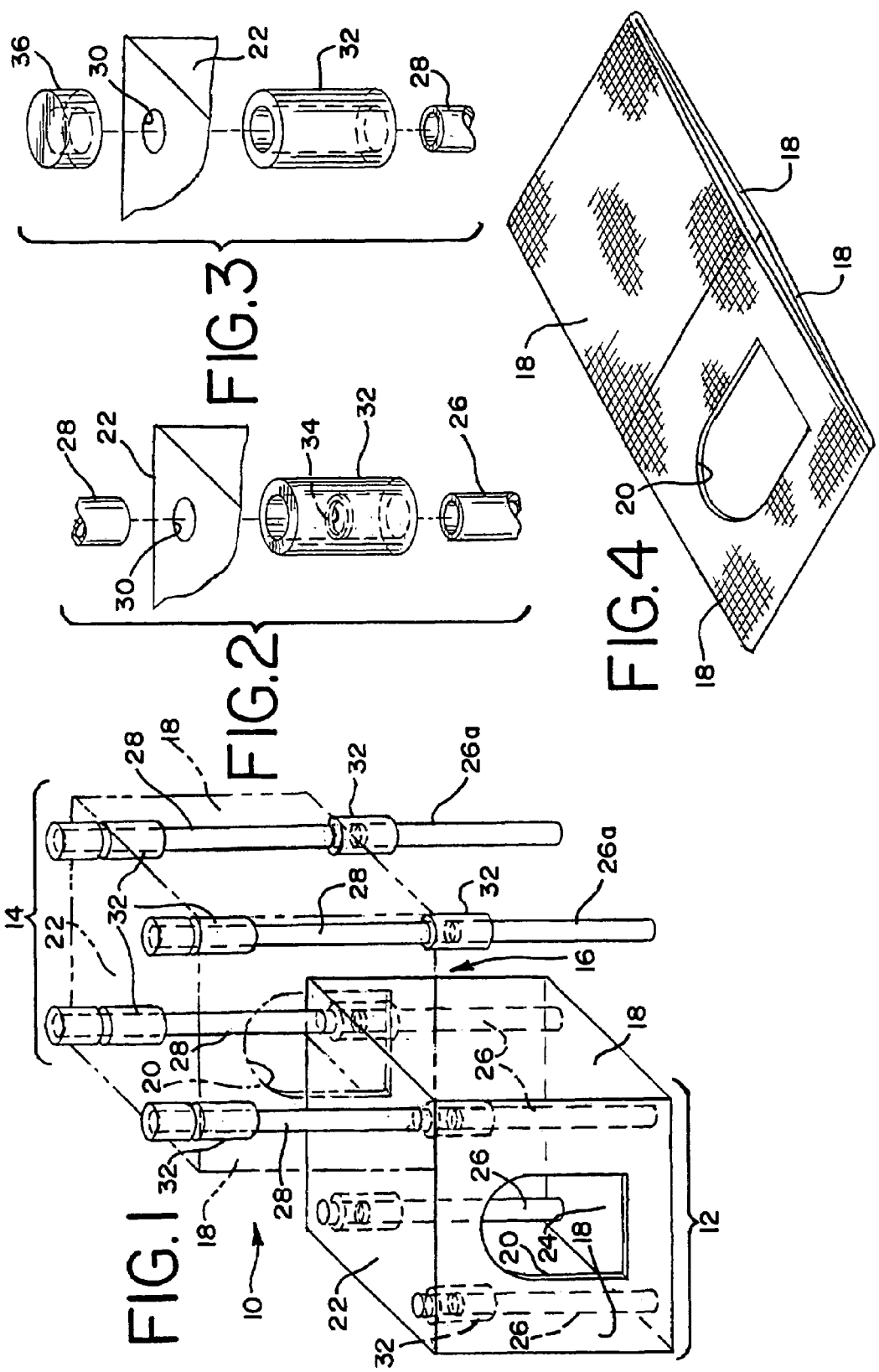

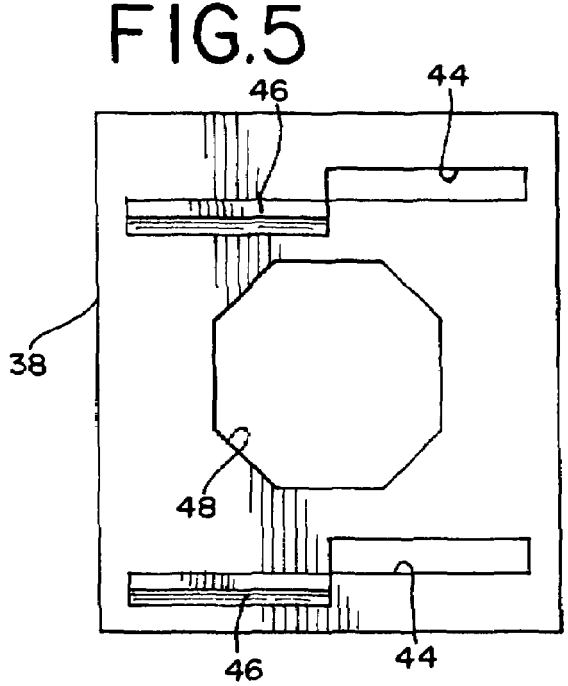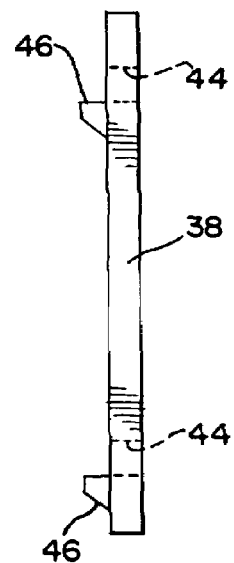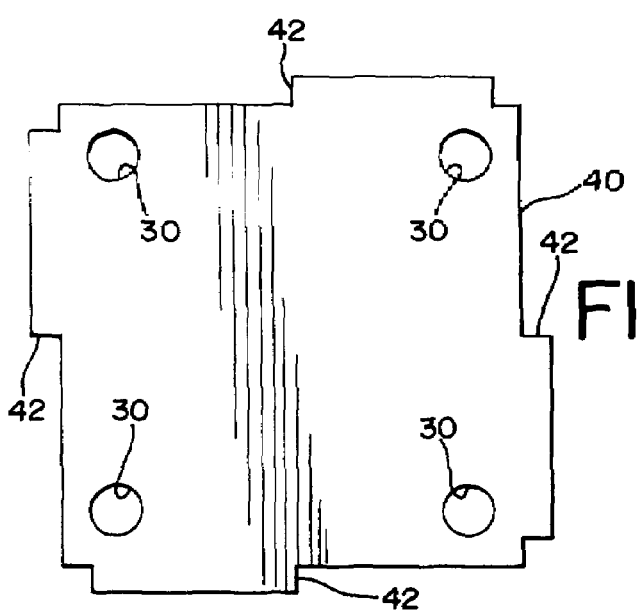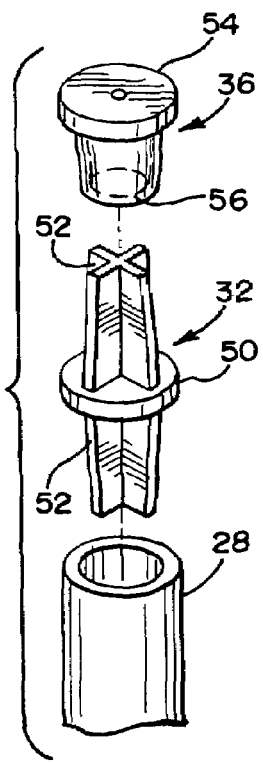

US 6,886,495 B1

MODULAR HOUSING FOR CATS

BACKGROUND OF THE INVENTION

The present invention relates, generally, to housing for household pets and, more particularly, to a modular housing for cats that is economical in construction and folds flat for shipping and/or storage.

As is widely known, cats are highly intelligent and curious creatures with a bent for playfulness. The recognition of this nature in cats has lead to a wide variety of housing and climbing structures, such as those shown in Raich U.S. Pat. No. 4,347,807 and Cook U.S. Pat. No. 5,577,465.

Many of the structures presently available are rigid, multi-levels structures or tree-like structures having a variety of perches, toys, housings and/or scratching posts associated therewith. The structures are commonly in their assembled condition at the point of purchase, thus increasing the size of the product for shipping and storage, as well as the expense attendant therewith. In addition, the structures typically are not intended to be modified by the purchaser. This inability to modify the configuration of the structure may render unsuitable for alternative locations in the pet owner's home, and may also render the housing itself unused, should the cat become bored with its particular configuration.

Accordingly, it is principle object of the present invention to provide a modular pet housing that permits assembly of a plurality of basic modules into a variety of different configurations determined by the needs and desires of the pet owner.

It is a further object to provide a modular pet housing that folds to a generally-flat configuration to minimize shipping and storage costs.

It is a still further object to provide a modular pet housing that is economical in its construction.

SUMMARY OF THE INVENTION

These objects, as well as others that will become apparent upon references to following detailed description and accompanying drawings, are accomplished by a modular, multi-level pet housing that comprises a plurality of multi-sided, boxes that are foldable to a generally-flat configuration. A top and bottom is provided for each box. The boxes may take any number of different shapes. In the preferred embodiment, the boxes have four rectangularly shape side walls in which the edges of the side walls are connected to the adjacent side wall so as to form a single piece. A plurality of support columns of a first length generally less than the height of the side walls and a plurality of support columns of a second length generally longer than the height of the side walls are provided. These support columns are preferably tubular and provided with ends that have a cross-sectional size and shape that is substantially the same so that they may be joined to each other by a coupling. The top and bottom of each box is formed with a plurality of holes adjacent the periphery sized to selectively permit one of the support members to fit therethrough, but to prevent an associated coupling from fitting therethrough. Preferably, a cap is provided for mounting to a support column exterior of the uppermost housing. Consequently, a multi-level pet housing having a base level is constructed by stacking one or more boxes on top of a box resting on the base level in which support columns of the first length are located within each base level box and a tubular column of the second length extends through the hole in the top of box to receive in a coupling so as to be connected to the corresponding tubular member in the base level box.

In another aspect of the invention, the side walls and the top and bottom may be constructed of any of a number of different sheet or flat materials, such as wood, plastic, particle board, fiber board, plastic and corrugated cardboard. The side walls may be covered with a fabric, such as burlap, to provide increased strength and durability in the hinge area. The tubular members and couplings, when assembled, may be secured to each other by friction, a fastener, or by an adhesive. The top and bottom may be made of more rigid material, such as wood or fiber board.

BRIEF DESCRIPTION OF THE DRAWING

FIG. 1 is a perspective view showing an assembled pet housing according to the present invention comprising two modules, one module being shown in phantom to permit visualization of the structural elements of the assembly.

FIG. 2 is an exploded, fragmentary perspective view showing how two column members are connected together by a coupling in manner to support a top or bottom of a box as used in the present invention.

FIG. 3 is an exploded, fragmentary perspective view showing how a coupling and cap cooperate with a column member to support the top of a box as used in the present invention.

FIG. 4 is perspective view of the sides of a box for use in the present invention showing how the box collapses to a generally-flat condition for shipping and storage.

FIG. 5 is a plan view of a panel that may be used as a side wall in an alternative embodiment of the present invention.

FIG. 6 is a end view of the panel shown in FIG. 5.

FIG. 7 is a plan view of a panel adapted for use with the side wall of FIGS. 5 and 6 in an alternative embodiment of the present invention.

FIG. 8 is an exploded perspective view showing an alternate embodiment of a coupling and cap for use with a column in the present invention.

DETAILED DESCRIPTION

Turning to FIG. 1, there has seen a perspective view of an assembled modular cat housing, generally designated 10, according to the present invention. As illustrated, the housing 10 includes one base level unit 12 and an upper level unit 14 supported, in part, by the base unit 12 and forming an over hang 16. The assembled housing 10 has been shown with only two units or boxes 12, 14, to simply illustrate the nature of the relationship between the various components of the assembly. As can be readily appreciated, the precise configuration of the assembled housing is dependent upon the number of units used and the imagination of the person assembling the housing.

As shown in FIG. 1, each of the units 12, 14 is formed with four generally rectangular side walls 18 that are connected on their edges to the adjacent side walls and, when in the assembled housing 10, are orientated substantially vertically with respect to the base on which they are supported. Of course, while the units 12, 14 have been described as "boxes" they can be of any number of different geometric or polyhedral shapes, such as an octahedron, decahedron, etc. so long as the top and bottom of each unit are in generally parallel planes. Thus, the term "boxes" is intended to include such additional shapes. Typically, one of the side walls 18 is formed with an opening 20 that is size to allow a cat to pass therethrough to permit it to enter or leave the interior of an assembled unit. The side walls 18 may be made of any sheet-like material having sufficient rigidity including, e.g., expandable styrene or propylene foam (EPS or EPP), plywood, corrugated cardboard, particle board, and fiberboard.

A fabric, such as burlap, carpeting or sisal, may be mounted to an exterior surfaces of the side walls. The fabric provides for an improved appearance of the housing, as well as reinforcement for the hinge areas of the side walls, i.e., where the edges of the adjacent side walls meet.

In keeping with one aspect of the invention, the side walls 18 are able to collapse to a substantially flat condition, as shown in FIG. 4, to facilitate the shipping and storage of the unassembled housing.

Each unit 12, 14 includes a top 22 and a bottom 24. The top and bottom are preferably separate from the side walls. Optionally, the tops 22 and bottoms 24 may be hingedly attached to the top and bottom edges, respectively, of one of the side walls 18. Alternatively, the tops 22 and bottoms 24 may be secured to the side walls 18 by complementary shapes in the tops/bottoms and side walls (such as tongue and groove, mortise and tenon, etc.) or by clips, brackets, pins or other fasteners well known in the art.

With reference to FIGS. 6–7, there is seen an alternative embodiment of side walls 38 and top/bottom walls 40 in accordance with the present invention. The top/bottom walls are of a generally rectangular shape, with tenons 42 on the edges that are received in complementary-shaped mortises 44 in the side walls 38. Thus, four side walls 38 and two tops/bottoms 40 can be assembled together to form a unit that can be used in the present invention. As shown, the tenons 42 are generally half-width and diametrically opposed, although they could be centered on the edges of the tops/bottoms 40. Of course, the mortises 44 on the sidewalls 38 would also need to be centered to receive the tenons 42 when the units are assembled.

The side walls 38 may also include half-width cleats 46 to provide additional support for the top/bottom 40 in the assembled unit. At least one, and preferably two, of the sidewalls will be formed an interior opening 48 (as shown, octagonal in shape—although other shapes may be used) to permit ingress/egress from the assembled unit. Similarly, one or both of the top/bottom walls 40 may be formed with an opening (not shown) to permit ingress/egress.

First and second support columns 26, 28, respectively, are utilized within each assembled unit to provide additional structural support and to interconnect the units to each other. While the support columns 26, 28 are shown as being tubular, other shapes may be used without departing from the invention.

As illustrated, the base unit 12 includes four support columns 26 (shown in phantom), one adjacent each corner of the unit. Each of these tubular columns 26 has a length that is somewhat less than the height of the unit. In keeping with another aspect of the invention, the tops 22 and bottoms 24 are provided with apertures 30 adjacent each corner that are sized to permit a support column 26 or 28 to fit therethrough. These apertures 30, or holes, help to locate the columns 26, 28 within the box. To more positively secure the columns 26, 28 in place and to provide support for the top, the columns 26, 28 are adapted to receive a coupling 32 on the end thereof that has a size and shape that precludes it from fitting through the holes 30 in the top 22 and/or bottom 24. As shown in FIGS. 1–3, the coupling 32 in the form of a sleeve having an outside diameter larger than the holes 30 in the tops 22/bottoms 24. Thus, a coupling 32 carried on the upper end of the column 26 or 28 engages the top 22 to provide support therefore. The columns 26, 28 and coupling 32 are preferably made from PVC, but may be made of other materials, such as other plastics, metal, wood, and structural paper.

A second support column 28 may be received by the coupling 32, the second support column 28 then protruding through the hole 30 in the top of the base unit 12. The second support column 28 may then be used to locate a corner of a second unit 14 that is stacked on top of the first unit 12. The second unit 14 may be stacked in alignment with the first unit 12, may have only one corner supported by the first unit 12, or, as shown in FIG. 1, have one edge of the second unit 14 supported on the first unit with the opposite edge of the second unit 14 being supported by free standing columns 26a and couplings 32.

In the illustrated embodiment, the when the couplings 32 are in the form of sleeves, they may include an internal rib 34 that serves to limit the degree to which the coupling 32 can slide over the column, thus ensuring a sufficient length of coupling to both support the top 22 and receive and hold a second column.

The second columns 28 are preferably sized in length to be greater than the height of the side walls 18 an amount sufficient so that, when secured to a first column 26 in the first unit 12 by a coupling 32, the upper end of the second column 28 extends through the aligned hole 30 in the top of the second unit 14. As illustrated, the end of the support column 28 that extends through the hole 30 in the top of the second unit 14 may receive a cap 26, which is simply a coupling with an end wall thereon, the end wall being oversized with respect to the holes 30. Thus, the top 22 in the second unit 14 is secured to its associated second column 28 by being clamped between a coupling 32 on the column 28 in the interior of the unit 14 and a cap 34 on the column 28 unit 14.

As is readily appreciated, the columns 26, 28 and couplings 32, and caps 36 can have a variety of cross-sectional shapes, so long as the ends of the columns 26, 28 are of substantially the same size and shape so as to permit them to fit through the holes in the tops and bottoms of the units and to receive a coupling 32 and/or cap 36. In the illustrated embodiment, the columns 26, 28 are made of PVC pipe having an outside diameter of approximately one inch, while the couplings 32 and caps 36 are made of PVC pipe having a complimentary inside diameter. The couplings 32 and caps 36 may be secured to the columns 26, 28 simply by friction or, alternatively, adhesive or fasteners can be used.

With reference to FIG. 8, alternate embodiments for the coupling 32 and cap 36 are shown. The coupling 32 includes a central spacer 50 configured to have a size and shape larger and/or different from the cross-sectional shape of the column 28 so that the spacer cannot fit in the interior of the column 28 and so that the spacer sufficiently engages the tops/bottoms to provide support.

The spacer 50 has two faces with an elongated member 52 extending from each face. The elongated members 52 are sized to fit into the interior of the column 26/28. Preferably, the elongated members taper from the spacer 50 to their free ends to facilitate their insertion into the columns 28. This tapering also ensures that the couplings may be used with columns having slightly different inside diameters, which can occur due to differing manufacturing tolerances. As illustrated, the elongated members 52 have an X-shaped cross-section. However, it is clear that many other shapes could be used (e.g. circular or star-shaped) as long as the elongated member presents a bearing surface that will engage the inside surface of the columns 28.

The cap 36 in FIG. 8 is similar to the couplings 32 in FIG. 8 in that it also includes a spacer 54 oversized with respect to the inside diameter of the columns 28 and to the holes 30 in the tops 22/bottoms 24, and an elongated member 56 that extends from one of the faces of the spacer 54. The elongated member 56 is sized to fit over the elongated member 52 of the coupling 32. Thus, a top 24 may be clamped in place between the spacer 50 on the coupling and the spacer 54 on the cap. As illustrated, the elongated member 56 has a circular cross-section, but, like the elongated members 52, may have other shapes dictated by the shape of the interfitting portion of the coupling. Like the elongated members 52, the elongated member 56 is tapered from the spacer 54 to its free end to facilitate insertion into the columns.

Thus, a modular cat housing has been provided that meets all the objects of the present invention. While the invention has been disclosed in terms of certain preferred embodiments, there is no intent to limit it to the same and variations which would be obvious to those of skilled in the art are contemplated. For example, the shorter column members have been described as being used in connection with a base level unit and the longer tubular columns with the upper units. However, this could be reversed without departing from the invention. Also, accessories such as ramps, and ladders, scratching posts, etc., may be used with the modular housing without departing from the invention.

What is claimed is:

1. A modular multi-level pet housing comprising:
   a plurality of multi-sided boxes, each box having a plurality of side walls of a predetermined height, a top and a bottom;
   a plurality of first support columns of a first length generally less than the height of the side walls;
   a plurality of second support columns of a second length generally longer then height of the side walls;
   the first and second support columns having ends with a cross-sectional size and shape that is substantially the same;
   a plurality of coupling members adapted to be received on the ends of the first and second columns;
   the top and bottom of each box being formed with a plurality of holes sized to selectively permit one of the first and second tubular members to fit therethrough, but to prevent a coupling member from fitting therethrough;
   whereby a multi-level pet housing is constructed by stacking one or more boxes on top of a first box resting on a base level in which one of the first support columns is located within the first box aligned with the holes in the top and bottom and have a coupling member mounted thereon, and the second tubular column located within a second box is connected to coupling to secure the second box thereto.

2. The modular pet housing of claim 1 wherein one or more of the couplings includes an end wall so as to define a cap member incapable of having a further support member connected thereto.

3. The modular pet housing of claim 1 wherein the support members and couplings have complementary cross-sections.

4. The modular pet housing of claim 1 wherein the support members and couplings are made of PVC.

5. The modular pet housing of claim 1 wherein the support members and couplings in the assembled housing are secured to each other by friction.

6. The modular cat housing of claim 1 wherein the support members and couplings are secured to each other by a fastener.

7. The modular cat housing of claim 1 wherein the support members and couplings are secured to each other by an adhesive.

8. The modular pet housing of claim 1 wherein the side walls of the boxes are made of styrene foam.

9. The modular pet housing of claim 8 wherein the sides of the boxes are covered with fabric.

10. The modular pet housing of claim 1 wherein the tops and the bottoms of the boxes are made of styrene foam.

11. The modular pet housing of claim 1 wherein at least one of the side walls, top and bottom of each box has an opening therein sized to permit ingress and egress of a pet.

12. The modular pet housing of claim 1 wherein the tops and bottoms of each box are separate from the side walls and are secured thereto during assembly.

13. The modular pet housing of claim 1 wherein the top and bottom walls of each box are connected on one or more edges to the adjacent side wall.

14. The modular pet housing of claim 1 wherein the couplings have an interior circumferential rib sized to abut the end of a first or second tubular column when received therein.

* * * * *